United States Patent
Yamaura et al.

(10) Patent No.: US 8,922,181 B2
(45) Date of Patent: Dec. 30, 2014

(54) POWER CONTROL CIRCUIT PERFORMING SOFT START OPERATION. POWER SUPPLY DEVICE, AND ELECTRONIC DEVICE

(75) Inventors: Hidetaka Yamaura, Kasugai (JP); Takehito Doi, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 138 days.

(21) Appl. No.: 12/819,890

(22) Filed: Jun. 21, 2010

(65) Prior Publication Data

US 2010/0320981 A1 Dec. 23, 2010

(30) Foreign Application Priority Data

Jun. 23, 2009 (JP) .................................. 2009-148930

(51) Int. Cl.
 *H02M 1/36* (2007.01)
 *H02M 3/157* (2006.01)
 *H02M 3/156* (2006.01)
(52) U.S. Cl.
 CPC .............. *H02M 1/36* (2013.01); *H02M 3/156* (2013.01); *Y10S 323/901* (2013.01)
 USPC ........................................ 323/283; 323/901
(58) Field of Classification Search
 CPC ................................ H02M 1/36; H02M 3/157
 USPC ............... 323/223–226, 259, 266, 271, 280, 323/282–284, 901; 363/49
 See application file for complete search history.

(56) References Cited

U.S. PATENT DOCUMENTS

| 5,610,503 | A | * | 3/1997 | Fogg et al. .................... 323/283 |
| 5,625,279 | A | * | 4/1997 | Rice et al. ..................... 323/283 |
| 6,674,272 | B2 | * | 1/2004 | Hwang .......................... 323/284 |
| 7,193,401 | B1 | | 3/2007 | Hasegawa |
| 7,626,371 | B2 | * | 12/2009 | Hoshino et al. ............... 323/283 |
| 7,675,279 | B2 | * | 3/2010 | Okamoto et al. .............. 323/283 |
| 7,714,557 | B2 | * | 5/2010 | Hasegawa ..................... 323/283 |
| 7,852,642 | B2 | * | 12/2010 | Yu ..................................... 363/49 |
| 7,884,584 | B2 | * | 2/2011 | Furuse et al. .................. 323/222 |
| 2005/0276294 | A1 | * | 12/2005 | Crawford et al. ........... 372/38.02 |
| 2007/0139023 | A1 | | 6/2007 | Hasegawa |
| 2008/0079409 | A1 | * | 4/2008 | Motomori et al. ............ 323/283 |
| 2009/0273324 | A1 | * | 11/2009 | Okamoto et al. ............. 323/282 |

FOREIGN PATENT DOCUMENTS

| JP | 2007-159319 A | 6/2007 |
| JP | 2007-174771 A | 7/2007 |
| JP | 2008-092740 A | 4/2008 |
| JP | 2008-245431 A | 10/2008 |
| JP | 2008-263714 A | 10/2008 |

OTHER PUBLICATIONS

Notice of Reasons for Rejection mailed Jul. 30, 2013 in Japanese application No. 2009-148930.

* cited by examiner

*Primary Examiner* — Gary L Laxton
(74) *Attorney, Agent, or Firm* — Sterne, Kessler, Goldstein & Fox P.L.L.C.

(57) ABSTRACT

A power control circuit includes a control circuit configured to perform a soft start operation before a power supply device performs a normal operation. The power control circuit also includes a counter circuit configured to divide a switching frequency of the power supply device in the normal operation, wherein the counter circuit measures a period of the soft start operation and when the period lasts for a set length, starts to divide the switching frequency, and wherein the power control circuit causes a comparator comprising the counter circuit to compare the frequency obtained by dividing the switching frequency with a reference frequency and corrects the switching frequency.

15 Claims, 4 Drawing Sheets

POWER CONTROL CIRCUIT PERFORMING SOFT START OPERATION. POWER SUPPLY DEVICE, AND ELECTRONIC DEVICE

CROSS-REFERENCE TO RELATED APPLICATION

This application is based upon and claims the benefit of priority of the prior Japanese Patent Application No. 2009-148930, filed on Jun. 23, 2009, the entire contents of which are incorporated herein by reference.

FIELD

The application relates to a power control circuit, a power supply device, and an electronic device.

BACKGROUND

Generally, an electronic device includes a DC-DC converter. The DC-DC converter steps up or steps down an input voltage from, for example, a lithium ion battery or a dry battery, generates an output voltage at a desired level, and supplies the output voltage as a power source to an electronic component (e.g., a load) in a semiconductor device included in the electronic device.

A comparator-type DC-DC converter may respond at high speed even when a sudden load change occurs is an example of one such DC-DC converters.

The comparator-type DC-DC converter causes a switching element to be turned on for a given length of time, compares an output voltage with a reference voltage, controls a length of time for which the switching element is turned off based on the comparison result, and generates an output voltage to be targeted (e.g., a target voltage). That is, the comparator-type DC-DC converter generates the target voltage by controlling a switching frequency.

The switching frequency that the comparator-type DC-DC converter controls may change due to a difference between an input voltage and an output voltage, or a load change for example. This switching frequency change may cause broadband radiated noise, however, it is difficult to reduce the broadband radiated noise. As a result, performance may be lowered in a typical device that uses a tiny signal with a high frequency, such as an audio-visual device.

To address such problems, a comparator-type DC-DC converter discussed in, for example, JP-A-2007-159319 or JP-A-2007-174771 includes a phase comparator for comparing phases of a switching frequency and a reference clock signal, and controls the switching frequency to be constant based on the comparison result.

However, the typical comparator-type DC-DC converter necessitates an additional clock generation circuit for generating a reference clock signal or desires that the reference clock signal is input from outside. Further, when the frequency of the reference clock signal differs from the switching frequency, the comparator-type DC-DC converter necessitates a frequency division circuit for balancing the switching frequency and the frequency of the reference clock signal.

SUMMARY

According to an aspect, a power control circuit includes a control circuit configured to perform a soft start operation before a power supply device performs a normal operation, and a counter circuit configured to divide a switching frequency of the power supply device in the normal operation, wherein the counter circuit measures a period of the soft start operation and when the period lasts for a set length, starts to divide the switching frequency, and wherein the power control circuit causes a comparator comprising the counter circuit to compare the frequency obtained by dividing the switching frequency with a reference frequency and corrects the switching frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENT

Figure 1:
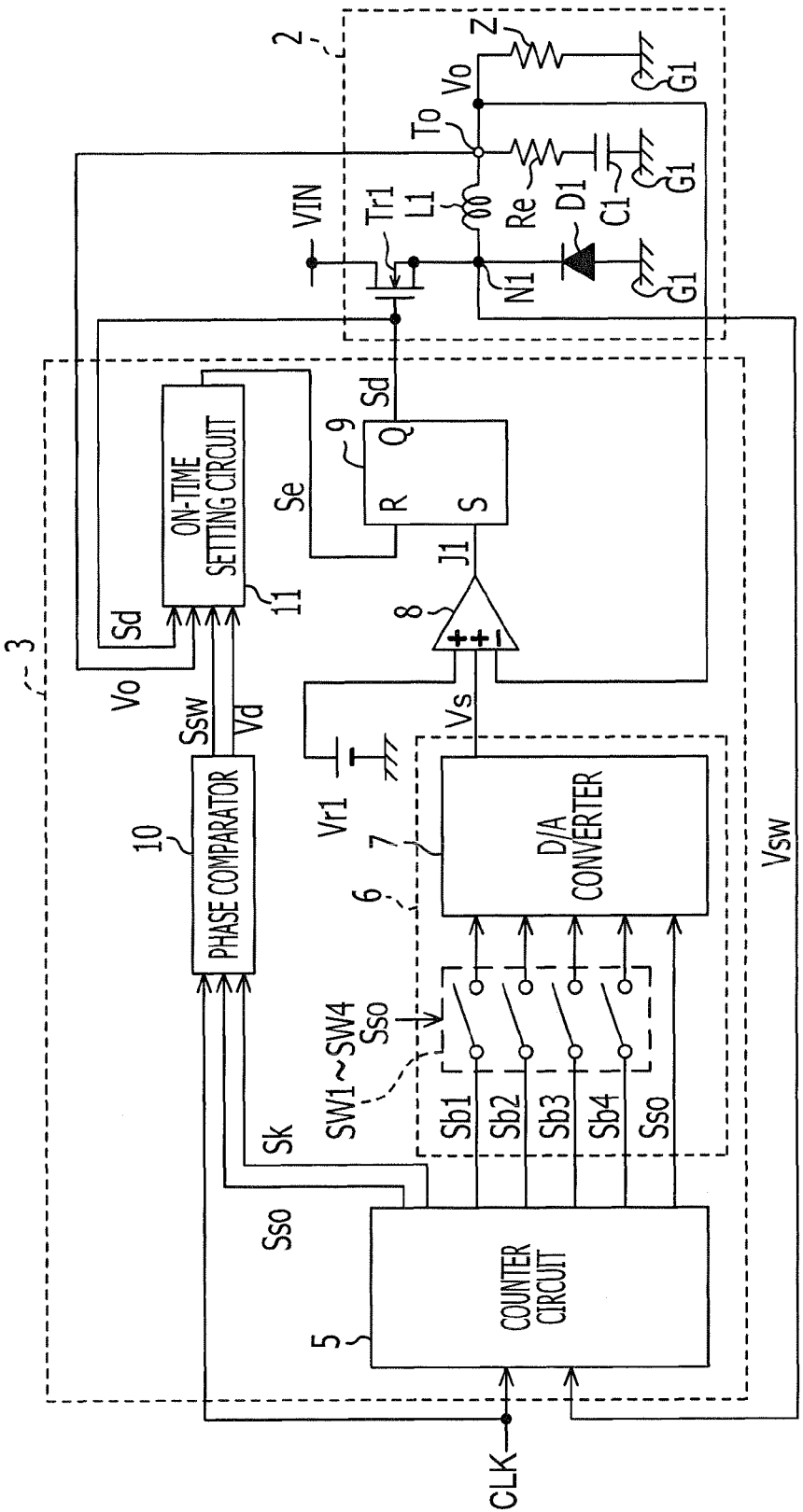
FIG. 1 illustrates a DC-DC converter according to an embodiment.

A DC-DC converter 1 as illustrated in FIG. 1 is a comparator-type DC-DC converter. The DC-DC converter 1 is a step-down DC-DC converter that generates an output voltage Vo by stepping down an input voltage VIN, and includes a converter part 2, and a control circuit 3. The converter part 2 includes an output transistor Tr1, which is an N-channel metal oxide semiconductor (NMOS) transistor, a diode D1, a choke coil L1, and a smoothing capacitor C1.

The control circuit 3 of the DC-DC converter 1 performs a soft start operation. The soft start operation includes stepping up the output voltage Vo gradually to a given target value to reduce and prevent a rush current that may be caused when the input voltage VIN of the DC-DC converter 1 is supplied. In the embodiment, the DC-DC converter 1 performs a digital soft start operation in which the output voltage Vo is raised in stages up to the given target value.

When the soft start operation is completed, that is, when the input voltage VIN starts to be supplied and the output voltage Vo is raised in stages up to the given value, the DC-DC converter 1 starts a normal operation in which the output voltage Vo is controlled to reach the given target value.

As illustrated in FIG. 1, a driving signal Sd is input from the control circuit 3 to the gate of the output transistor Tr1 of the converter part 2. The source of the output transistor Tr1 is supplied with the input voltage VIN. The drain of the output transistor Tr1 is coupled to the cathode of the diode D1. The anode of the diode D1 is coupled to a ground line G1. A voltage obtained at a coupling point of the output transistor Tr1 and the diode D1, e.g., a node N1, is output as a switching voltage Vsw to the control circuit 3. The node N1 is coupled to an outside output terminal To through the choke coil L1.

Since the outside output terminal To is coupled to the ground line G1 through the smoothing capacitor C1 as further illustrated in FIG. 1, the choke coil L1 and the smoothing capacitor C1 may function as smoothing circuits. A resistor Re coupled between the outside output terminal To and the smoothing capacitor C1 represents an equivalent series resistance by the smoothing capacitor C1.

The converter part 2, as illustrated in FIG. 1, steps down the input voltage VIN by turning on or off the output transistor Tr1 based on the driving signal Sd from the control circuit 3, and supplies the resultant voltage as the output voltage Vo from the outside output terminal To to a load Z. The DC-DC converter 1 controls the output voltage Vo to be maintained at the given target value by changing a ratio between a length of time for which the output transistor Tr1 is turned on (hereinafter referred to as an "ON time" or an "ON state") and a length of time for which the output transistor Tr1 is turned off (hereinafter referred to as an "OFF time" or an "OFF state"), that is, a duty ratio.

Depending on the ON state or the OFF state of the output transistor Tr1, the switching voltage Vsw transitions between the level of the input voltage VIN and the ground level. When the output transistor Tr1 is turned on, the switching voltage Vsw reaches the level of the input voltage VIN. When the output transistor Tr1 is turned off, the switching voltage Vsw reaches the ground level. That is, the frequency of the switching voltage Vsw, which transitions between the level of the input voltage VIN and the ground level, and the frequency on which the output transistor Tr1 performs switching are substantially the same.

As further illustrated in FIG. 1, the control circuit 3 includes a counter circuit 5, a digital-to-analog (D/A) conversion part 6, a first comparator circuit 8, a pulse generator 9, a phase comparator 10, and an ON-time setting circuit 11.

Figure 2:
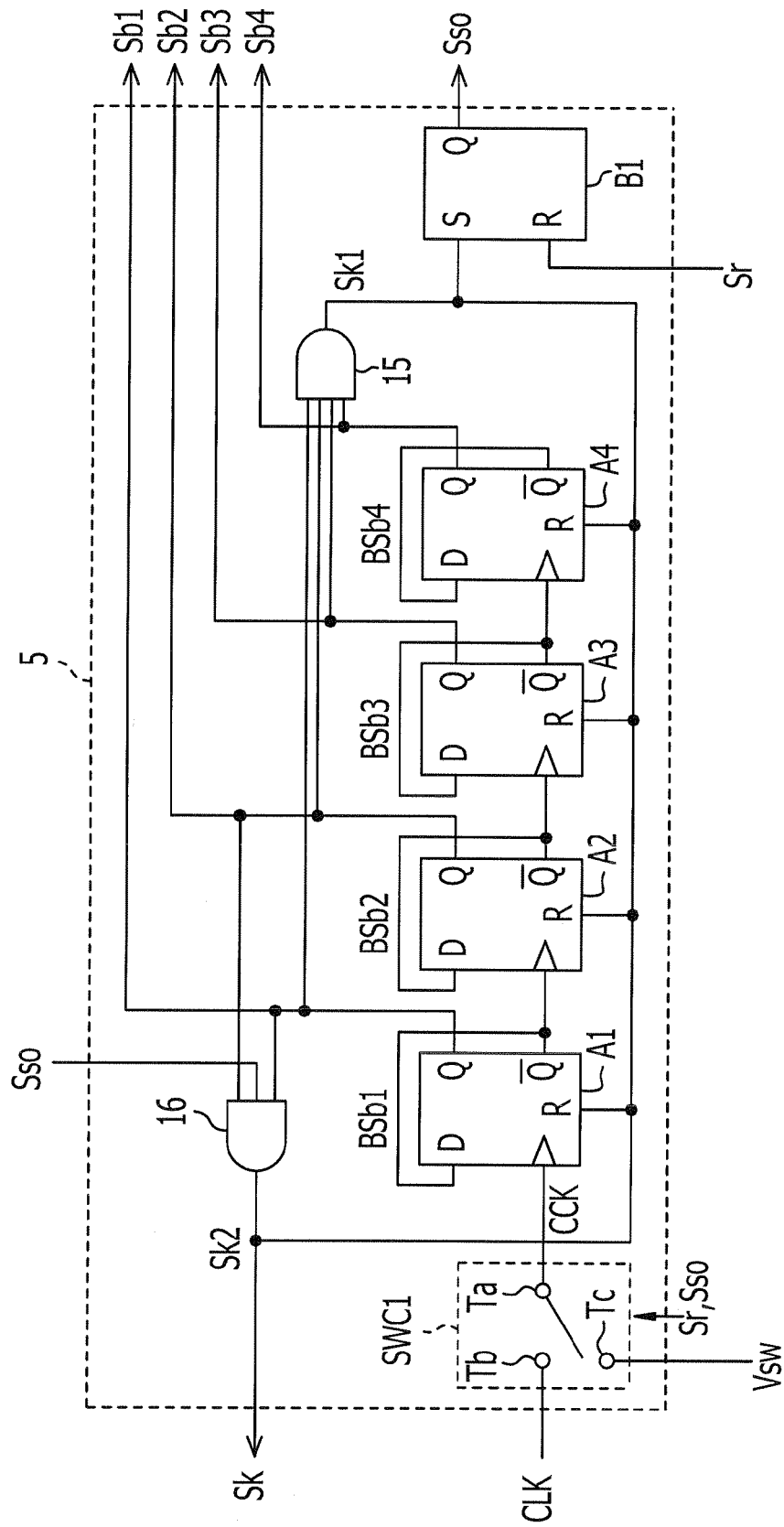
FIG. 2 illustrates a counter circuit according to the embodiment in FIG. 1.

As illustrated in FIG. 2, the counter circuit 5 includes first to fourth D-flip-flop (D-FF) circuits A1 to A4, a first RS-flip-flop (RS-FF) circuit B1, a first changeover switch SWC1, and a first AND circuit 15, and a second AND circuit 16.

The first D-FF circuit A1 in FIG. 2 receives a reference clock signal CLK, which is input from an outside device (not depicted) through the first changeover switch SWC1, or the switching voltage Vsw, which is input from the converter part 2 through the first changeover switch SWC1, as a counter clock signal CCK. The first changeover switch SWC1 receives a reset signal Sr from the outside device, and receives a soft-start completion signal Sso from the first RS-FF circuit B1.

The reset signal Sr restores initial settings of the DC-DC converter 1 when the input voltage VIN is supplied to the DC-DC converter 1. For example, when the input voltage VIN is supplied to the DC-DC converter 1, the reset signal Sr rises from an L level to an H level for a given length of time.

The soft-start completion signal Sso reports that the soft start operation of the DC-DC converter 1 is completed. For example, the soft-start completion signal Sso reaches the L level when the input voltage VIN is supplied to the DC-DC converter 1. The soft-start completion signal Sso reaches the H level when the soft start operation is completed, and the soft-start completion signal Sso is maintained at the H level.

The first changeover switch SWC1 in FIG. 2 causes a first terminal Ta to be coupled to a second terminal Tb or a third terminal Tc based on the reset signal Sr and the soft-start completion signal Sso that are input, and outputs the counter clock signal CCK to the first D-FF circuit A1 based on the reference clock signal CLK input from the outside device, or the switching voltage Vsw input from the converter part 2 in FIG. 1.

For example, the first changeover switch SWC1 causes the first terminal Ta to be coupled to the second terminal Tb when the input voltage VIN is supplied to the DC-DC converter 1, and the H-level reset signal Sr from the outside device, and the L-level soft-start completion signal Sso from the first RS-FF circuit B1. Accordingly, the first changeover switch SWC1 outputs the counter clock signal CCK based on the reference clock signal CLK to the first D-FF circuit A1.

When the soft start operation of the DC-DC converter 1 is completed and the first changeover switch SWC1 receives the H-level reset signal Sr from the outside device and the H-level soft-start completion signal Sso from the first RS-FF circuit B1, the first changeover switch SWC1 causes the first terminal Ta to be coupled to the third terminal Tc. Accordingly, the first changeover switch SWC1 outputs the counter clock signal CCK based on the switching voltage Vsw to the first D-FF circuit A1.

Figure 3:
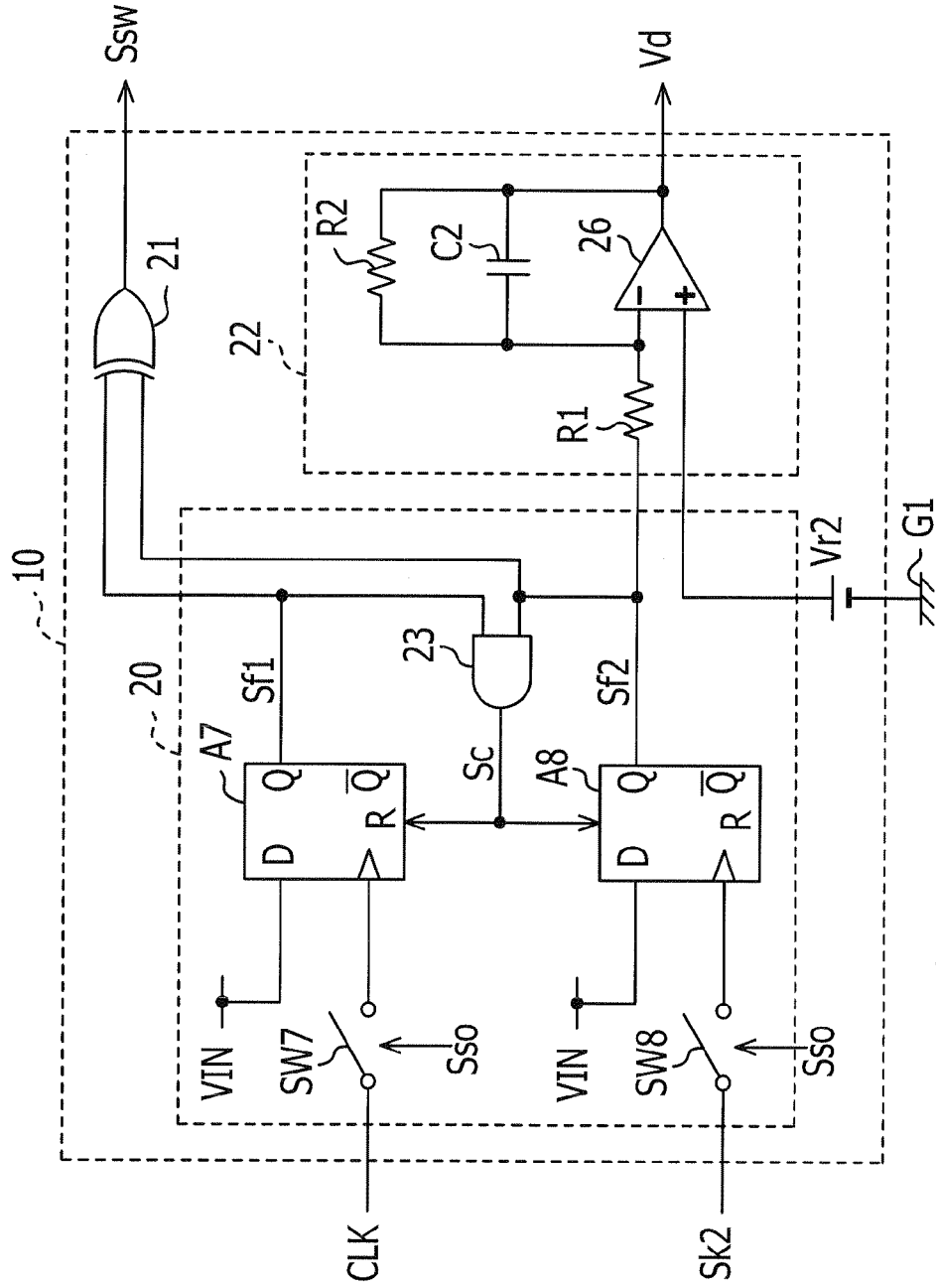
FIG. 3 illustrates a phase comparator according to the embodiment in FIG. 1.

The counter clock signal CCK is input to a clock input terminal CK of the first D-FF circuit A1. Each overlined Q in FIGS. 2 and 3 is herein indicated as *Q. A data input terminal D of the first D-FF circuit A1 and an inverting output terminal *Q of the first D-FF circuit A1 are coupled to each other. A first count signal Sk1 from the first AND circuit 15 and a second count signal Sk2 from the second AND circuit 16 are input to a reset input terminal R of the first D-FF circuit A1.

As further illustrated in FIG. 2, a first frequency division signal Sb1 is output from an output terminal Q of the first D-FF circuit A1 to the first AND circuit 15, the second AND circuit 16, and the D/A conversion part 6 in FIG. 1. A first inversion frequency division signal BSb1 is output from the inverting output terminal *Q of the first D-FF circuit A1 to a clock input terminal CK of the second D-FF circuit A2.

The first D-FF circuit A1 in FIG. 2 causes the first frequency division signal Sb1 to transition between the L level and the H level every time the counter clock signal CCK rises from the L level to the H level. Thus, the first D-FF circuit A1 generates the first frequency division signal Sb1 that has a frequency obtained by dividing the frequency of the counter clock signal CCK by two.

As described above, the first inversion frequency division signal BSb1 from the first D-FF circuit A1 is input to the clock input terminal CK of the second D-FF circuit A2. The first count signal Sk1 from the first AND circuit 15 and the second count signal Sk2 from the second AND circuit 16 are input to a reset input terminal R of the second D-FF circuit A2. A data input terminal D of the second D-FF circuit A2 and an inverting output terminal (Q of the second D-FF circuit A2 are coupled to each other.

A second frequency division signal Sb2 is output from an output terminal Q of the second D-FF circuit A2 to the first AND circuit 15, the second AND circuit 16, and the D/A conversion part 6 in FIG. 1. A second inversion frequency division signal BSb2 is output from the inverting output terminal *Q of the second D-FF circuit A2 to a clock input terminal CK of the third D-FF circuit A3.

The second D-FF circuit A2 causes the second frequency division signal Sb2 to transition between the L level and the H level every time the first inversion frequency division signal BSb1 rises from the L level to the H level. That is, the second D-FF circuit A2 generates the second frequency division signal Sb2 that has a frequency obtained by dividing the frequency of the first frequency division signal Sb1 by two. Consequently, the frequency of the second frequency division signal Sb2 amounts to one fourth of the frequency of the counter clock signal CCK.

As described above, the second inversion frequency division signal BSb2 from the second D-FF circuit A2 is input to the clock input terminal CK of third D-FF circuit A3. The first count signal Sk1 from the first AND circuit 15 and the second count signal Sk2 from the second AND circuit 16 are input to a reset input terminal R of the third D-FF circuit A3. A data input terminal D of the third D-FF circuit A3 and an inverting output terminal *Q of the third D-FF circuit A3 are coupled to each other.

A third frequency division signal Sb3 is output from an output terminal Q of the third D-FF circuit A3 to the first AND circuit 15 and the D/A conversion part 6 in FIG. 1. A third inversion frequency division signal BSb3 is output from the inverting output terminal *Q of the third D-FF circuit A3 to a clock input terminal CK of the fourth D-FF circuit A4.

The third D-FF circuit A3 causes the third frequency division signal Sb3 to transition between the L level and the H level every time the second inversion frequency division signal BSb2 rises from the L level to the H level. That is, the third D-FF circuit A3 generates the third frequency division signal Sb3 that has a frequency obtained by dividing the frequency of the second frequency division signal Sb2 by two. Consequently, the frequency of the third frequency division signal Sb3 is one eighth of the frequency of the counter clock signal CCK.

As described above, the third inversion frequency division signal BSb3 is input from the third D-FF circuit A3 to the clock input terminal CK of the fourth D-FF circuit A4. The first count signal Sk1 from the first AND circuit 15 and the second count signal Sk2 from the second AND circuit 16 are input to a reset input terminal R of the fourth D-FF circuit A4. A data input terminal D of the fourth D-FF circuit A4 and an inverting output terminal *Q of the fourth D-FF circuit A4 are coupled to each other.

A fourth frequency division signal Sb4 is output from an output terminal Q of the fourth D-FF circuit A4 to the first AND circuit 15 and the D/A conversion part 6 in FIG. 1. The fourth D-FF circuit A4 causes the fourth frequency division signal Sb4 to transition between the L level and the H level every time the third inversion frequency division signal BSb3 rises from the L level to the H level. That is, the fourth D-FF circuit A4 generates the fourth frequency division signal Sb4 that has a frequency obtained by dividing the frequency of the third frequency division signal Sb3. Consequently, the frequency of the fourth frequency division signal Sb4 is one sixteenth of the frequency of the counter clock signal CCK.

Thus, the counter circuit 5 is configured as a 4-bit binary counter. The first to fourth frequency division signals Sb1 to Sb4 are output from the first to fourth D-FF circuits A1 to A4 as the least to most significant bits, respectively, and function as counter data being 4-bit digital data.

For example, the counter circuit 5 counts up the count data in a way such as "0000," "0001," "0010," . . . "1111." That is, when the count values are counted decimally, the counter circuit 5 counts up the count values in a way such as "0," "1," "2," . . . "15," every time it is detected that the counter clock signal CCK reaches the H level.

The first AND circuit 15 receives the first to fourth frequency division signals Sb1 to Sb4 output from the first to fourth D-FF circuits A1 to A4, respectively. When all of the input frequency division signals Sb1 to Sb4 are at the H level, the first AND circuit 15 outputs the H-level first count signal Sk1 to the reset input terminals R of the first to fourth D-FF circuits A1 to A4, a set input terminal S of the first RS-FF circuit B1, and the phase comparator 10.

That is, when the counter circuit 5 counts up to the count value "15," the first AND circuit 15 outputs the H-level first count signal Sk1. Accordingly, when the counter circuit 5 counts up to the count value "15," the first AND circuit 15 resets the first to fourth D-FF circuits A1 to A4 included in the counter circuit 5.

As further illustrated in FIG. 2, the first count signal Sk1 output from the first AND circuit 15 is input to the set input terminal S of the first RS-FF circuit B1. The reset signal Sr is input from outside to a reset input terminal R of the first RS-FF circuit B1. The soft-start completion signal Sso is output from an output terminal Q of the first RS-FF circuit B1 to a D/A converter 7 and the second AND circuit 16.

When it is detected that the reset signal Sr reaches the H level, the first RS-FF circuit B1 outputs the L-level soft-start completion signal Sso. When it is detected that the input first count signal Sk1 reaches the H level, the first RS-FF circuit B1 outputs the H-level soft-start completion signal Sso. When the input voltage VIN is supplied to the DC-DC converter 1, the first RS-FF circuit B1 resets the first count signal Sk1 to the L level.

The second AND circuit 16 receives the first and second frequency division signals Sb1 and Sb2 output from the first and second D-FF circuits A1 and A2, respectively, and receives the soft-start completion signal Sso. When all of the input first and second frequency division signals Sb1 and Sb2 and the input soft-start completion signal Sso are at the H level, the second AND circuit 16 outputs the H-level second count signal Sk2 to the reset input terminals R of the first to fourth D-FF circuits A1 to A4 and the phase comparator 10.

When the counter circuit 5 counts up the counter clock signal CCK to the count value "4" and both the first frequency division signals Sb1 and the second frequency division signal Sb2 reach the H level after the soft start operation of the DC-DC converter 1 is completed, the second AND circuit 16 outputs the H-level second count signal Sk2. Thus, when the soft start operation of the DC-DC converter 1 is completed and the counter circuit 5 counts the counter clock signal CCK based on the switching voltage Vsw up to the count value "4," the first to fourth D-FF circuits A1 to A4 of the counter circuit 5 are reset.

That is, when the counter circuit 5 counts the counter clock signal CCK based on the switching voltage Vsw up to the count value "4" after the soft start operation of the DC-DC converter 1 is completed, the second AND circuit 16 outputs the H-level second count signal Sk2. When the counter circuit 5 is reset, the second AND circuit 16 outputs the L-level second count signal Sk2.

After that, the second AND circuit 16 outputs the H-level second count signal Sk2 again when the counter circuit 5 counts the counter clock signal CCK based on the switching voltage Vsw up to the count value "4." When the above processes are repeated and the soft start operation of the DC-DC converter 1 is completed, the frequency of the second count signal Sk2 amounts to one fourth of the frequency of the counter clock signal CCK.

As illustrated in FIG. 1, the D/A conversion part 6 includes first to fourth switches SW1 to SW4 and the D/A converter 7.

The D/A converter 7 receives the first to fourth frequency division signals Sb1 to Sb4 input from the counter circuit 5 through the first to fourth switches SW1 to SW4. Each of the first to fourth switches SW1 to SW4 enters an open circuit state or a short circuit state based on the soft-start completion signal Sso output from the outside device. For example, when the L-level soft-start completion signal Sso is input, each of the switches SW1 to SW4 enters the short circuit state, and when the H-level soft-start completion signal Sso is input, each of the switches SW1 to SW4 enters the open circuit state.

The D/A converter 7 in FIG. 1 converts the count data, which includes the input frequency division signals Sb1 to Sb4, into a soft start voltage Vs being an analog signal and outputs the soft start voltage Vs to the first comparator circuit 8. That is, the D/A converter 7 increases the level of the soft start voltage Vs in stages every time the counter circuit 5 counts up the counter clock signal CCK upon detecting that the counter clock signal CCK reaches the H level. When the D/A converter 7 receives the H-level soft-start completion signal Sso from the counter circuit 5, the D/A converter 7 maintains the soft start voltage Vs at the level obtained at the time.

The D/A converter 7 in FIG. 1 increases the level of the soft start voltage Vs in stages every time the counter circuit 5 counts up the counter clock signal CCK. When the counter circuit 5 counts the counter clock signal CCK up to the count value "15," the soft start voltage Vs is maintained constant. In the embodiment, the value of the start voltage Vs is higher than the value of a first reference voltage Vr1 input to a non-inverting input terminal of the first comparator circuit 8 when the D/A converter 7 inputs the count data "1111."

As further illustrated in FIG. 1, the first reference voltage Vr1 is input to the non-inverting input terminal of the first comparator circuit 8. The soft start voltage Vs is input from the D/A converter 7 to another non-inverting input terminal of the first comparator circuit 8. The value of the first reference voltage Vr1 is smaller than the given target value of the output voltage Vo and is set based on the given target value of the output voltage Vo. The output voltage Vo is fed back and input to an inverting input terminal of the first comparator circuit 8. The first comparator circuit 8 compares the soft start voltage Vs, the first reference voltage Vr1, and the output voltage Vo that have been input, and outputs a determination signal J1 based on the comparison result to the pulse generator 9.

For example, the first comparator circuit 8 compares the value of a lower one of the soft start voltage Vs and the first reference voltage Vr1 with the value of the output voltage Vo.

That is, when the value of the lower one of the soft start voltage Vs and the first reference voltage Vr1 is lower than the value of the output voltage Vo, the first comparator circuit 8 outputs the L-level determination signal J1. When the value of the lower one of the soft start voltage Vs and the first reference voltage Vr1 is higher than or substantially equal to the value of the output voltage Vo, the first comparator circuit 8 outputs the H-level determination signal J1.

For example, since the value of the soft start voltage Vs is lower than the value of the first reference voltage Vr1 when the input voltage VIN is input to the DC-DC converter 1, the first comparator circuit 8 compares the soft start voltage Vs with the output voltage Vo. After that, the value of the soft start voltage Vs increases in stages and the value of the soft start voltage Vs becomes higher than or substantially equal to the value of the output voltage Vo, the first comparator circuit 8 compares the output voltage Vo with the first reference voltage Vr1.

The pulse generator 9 is an RS-FF circuit. The determination signal J1 is input from the first comparator circuit 8 to a set input terminal S of the pulse generator 9. An ON-time setting signal Se is input from the ON-time setting circuit 11 to a reset input terminal R of the pulse generator 9.

According to the embodiment, the ON-time setting signal Se output from the ON-time setting circuit 11 reaches the L level when the H-level driving signal Sd is output from an output terminal Q of the pulse generator 9 to the ON-time setting circuit 11, and reaches the H level after a given length of time set by the ON-time setting circuit 11.

When the H-level determination signal 31 is input to the set input terminal S of the pulse generator 9, the pulse generator 9 enters a set state, and the H-level driving signal Sd is output from the output terminal Q of the pulse generator 9 to the output transistor Tr1. When the H-level ON-time setting signal Se is input to the reset input terminal R of the pulse generator 9, the output terminal Q of the pulse generator 9 outputs the L-level driving signal Sd to the output transistor Tr1.

That is, the pulse generator 9 outputs the H-level driving signal Sd when the value of the output voltage Vo becomes lower than or substantially equal to the value of the first reference voltage Vr1, and outputs the L-level driving signal Sd after the given length of time set by the ON-time setting circuit 11 has elapsed.

Thus, when the value of the output voltage Vo is lower than or substantially equal to the value of the first reference voltage Vr1, the pulse generator 9 increases the value of the output voltage Vo by outputting the H-level driving signal Sd to the converter part 2 until the given length of time set by the ON-time setting circuit 11 has elapsed. After the given length of time set by the ON-time setting circuit 11 has elapsed, the pulse generator 9 decreases the value of the output voltage Vo by outputting the L-level driving signal Sd to the converter part 2 until the value of the output voltage Vo becomes lower than or substantially equal to the value of the first reference voltage Vr1.

That is, the pulse generator 9 generates a driving signal Sd as a pulse signal based on a duty ratio between the length of time set by the ON-time setting circuit 11, for which the H-level driving signal Sd is output, and the length of time for which the L-level driving signal Sd is output after the length of time set by the ON-time setting circuit 11 has elapsed until the value of the output voltage Vo becomes lower than or substantially equal to the value of the first reference voltage Vr1.

The output voltage Vo is controlled in a control loop including the first comparator circuit 8, the pulse generator 9, and the converter part 2, and maintained at the given target value based on the value of the first reference voltage Vr1. When the driving signal Sd of the pulse generator 9 reaches the L level and the output transistor Tr1 is turned off in the control loop, energy stored in the choke coil L1 while the output transistor Tr1 is turned on is released. When the energy stored in the choke coil L1 decreases and the value of the output voltage Vo becomes lower than the value of the first reference voltage Vr1, the driving signal Sd of the pulse generator 9 reaches the H level and is maintained at the H level for a given length of time. After that, the output transistor Tr1 is turned on again. The value of the output voltage Vo may be maintained at the given target value based on the value of the first reference voltage Vr1 by repeating the above processes.

As described above, the control circuit 3 of the DC-DC converter 1 includes the phase comparator 10, and the ON-time setting circuit 11. The phase comparator 10 and the ON-time setting circuit 11 control a timing at which the ON-time setting signal Se rises from the L level to the H level. In other words, the phase comparator 10 and the ON-time setting circuit 11 control the length of time for which the pulse generator 9 outputs the H-level driving signal Sd, that is, the length of time for which the output transistor Tr1 is turned on.

As illustrated in FIG. 3, the phase comparator 10 includes a phase comparator circuit 20, an exclusive OR (XOR) circuit 21, and an integrator circuit 22.

The phase comparator circuit 20 includes seventh and eighth D-FF circuits A7 and A8, seventh and eighth switches SW7 and SW8, and a third AND circuit 23.

As further illustrated in FIG. 3, the input voltage VIN is supplied to a data input terminal D of the seventh D-FF circuit A7, and the reference clock signal CLK is input to a clock input terminal CK of the seventh D-FF circuit A7 through the seventh switch SW7. A comparison signal Sc is input from the third AND circuit 23 to a reset input terminal R of the seventh D-FF circuit A7.

The seventh switch SW7 enters an open circuit state or a short circuit state based on the soft-start completion signal Sso output from the first RS-FF circuit B1 in FIG. 2. For example, the seventh switch SW7 enters the open circuit state when the L-level soft-start completion signal Sso is input, or enters the short circuit state when the H-level soft-start completion signal Sso is input.

That is, the seventh switch SW7 does not allow the reference clock signal CLK to reach the clock input terminal CK of the seventh D-FF circuit A7 during the soft start operation of the DC-DC converter 1. When the soft start operation is completed and the normal operation starts, the seventh switch SW7 allows the reference clock signal CLK to be input to the clock input terminal CK of the seventh D-FF circuit A7.

Accordingly, the seventh D-FF circuit A7 does not operate during the soft start operation of the DC-DC converter 1, but instead, operates when the soft start operation of the DC-DC converter 1 is completed and the normal operation of the DC-DC converter 1 starts.

Every time it is detected that the reference clock signal CLK reaches the H level, the seventh D-FF circuit A7 outputs the H-level input voltage VIN, which is supplied to the data input terminal D of the seventh D-FF circuit A7 at the time, and to the third AND circuit 23 and the XOR circuit 21 as a first FF signal Sf1. For example, when it is detected that the reference clock signal CLK reaches the H level, the H-level first FF signal Sf1 is output from an output terminal Q of the seventh D-FF circuit A7. The seventh D-FF circuit A7 outputs the L-level first FF signal Sf1 when the seventh D-FF circuit A7 receives the H-level comparison signal Sc from the third AND circuit 23.

The input voltage VIN is supplied to a data input terminal D of the eighth D-FF circuit A8. The second count signal Sk2 is input from the second AND circuit 16 of the counter circuit 5 in FIG. 2 to a clock input terminal CK of the eighth D-FF circuit A8 through the eighth switch SW8. The comparison signal Sc is input from the third AND circuit 23 to a reset input terminal R of the eighth D-FF circuit A8.

The eighth switch SW8 enters an open circuit state or a short circuit state based on the soft-start completion signal Sso output from the first RS-FF circuit B1 in FIG. 2. For example, the eighth switch SW8 enters the open circuit state when the L-level soft-start completion signal Sso is input, or enters the short circuit state when the H-level soft-start completion signal Sso is input.

That is, the eighth switch SW8 does not allow the second count signal Sk2 to reach the clock input terminal CK of the eighth D-FF circuit A8 during the soft start operation of the DC-DC converter 1. When the soft start operation is completed and the normal operation starts, the eighth switch SW8 allows the second count signal Sk2 to be input to the clock input terminal CK of the eighth D-FF circuit A8.

Every time it is detected that the second count signal Sk2 reaches the H level, the eighth D-FF circuit A8 outputs the H-level input voltage VIN, which is being supplied to the data input terminal D of the eighth D-FF circuit A8 at the time, to the third AND circuit 23, the XOR circuit 21, and the integrator circuit 22 as a second FF signal Sf2. For example, when it is detected that the second count signal Sk2 reaches the H level, the H-level second FF signal Sf2 is output from the output terminal Q of the eighth D-FF circuit A8. The eighth D-FF circuit A8 outputs the L-level second FF signal Sf2 when the eighth D-FF circuit A8 receives the H-level comparison signal Sc from the third AND circuit 23.

The third AND circuit 23 receives the first and second FF signals Sf1 and Sf2 output from the seventh and eighth D-FF circuits A7 and A8, respectively. When both the received FF signal Sf1 and the received FF signal Sf2 are at the H level, the third AND circuit 23 outputs the H-level comparison signal Sc to the reset input terminals R of the seventh and eighth D-FF circuits A7 and A8, and resets the seventh and eighth D-FF circuits A7 and A8.

As described above, when the seventh and eighth D-FF circuits A7 and A8 are reset when it is detected that the reference clock signal CLK and the second count signal Sk2 reach the H level. The phase comparator circuit 20 detects a time difference between a timing at which the reference clock signal CLK reaches the H level and a timing at which the second count signal Sk2 reaches the H level.

For example, when the reference clock signal CLK reaches the H level later than the second count signal Sk2, the eighth D-FF circuit A8 outputs the H-level second FF signal Sf2 upon detecting that the second count signal Sk2 reaches the H level. When the seventh D-FF circuit A7 detects that the reference clock signal CLK reaches the H level, the eighth D-FF circuit A8 causes the second FF signal Sf2 to fall from the H level to the L level and outputs the L-level second FF signal Sf2.

The eighth D-FF circuit A8 outputs the H-level second FF signal Sf2 having a pulse width dependent on the time difference between the timings at which the reference clock signal CLK and the second count signal Sk2 rise to the H level. The eighth D-FF circuit A8 outputs the H-level second FF signal Sf2 having a large pulse width when the time difference is large. When the time difference is small, the eighth D-FF circuit A8 outputs the H-level second FF signal Sf2 having a small pulse width.

Based on the H-level second FF signal Sf2 output from the eighth D-FF circuit A8, it may be determined that a cycle of the reference clock signal CLK is longer than a cycle of the second count signal Sk2. Further, the pulse width of the H-level second FF signal Sf2 indicates a difference between the cycle lengths of the reference clock signal CLK and the second count signal Sk2.

When the reference clock signal CLK rises to the H level earlier than the second, count signal Sk2, the seventh D-FF circuit A7 outputs the H-level first FF signal Sf1 upon detecting that the reference clock signal CLK rises to the H level. When the eighth D-FF circuit A8 detects that the second count signal Sk2 reaches the H level, the seventh D-FF circuit A7 causes the first FF signal Sf1 to fall from the H level to the L level and outputs the L-level first FF signal Sf1.

That is, the seventh D-FF circuit A7 outputs the H-level first FF signal Sf1 having a pulse width dependent on the time difference between the timings at which the reference clock signal CLK and the timing the second count signal Sk2 rise to the H level. The seventh D-FF circuit A7 outputs the H-level first FF signal Sf1 having a large pulse width when the time difference is large. When the time difference is small, the seventh D-FF circuit A7 outputs the H-level first FF signal Sf1 having a small pulse width.

Based on the H-level first FF signal Sf1 output from the seventh D-FF circuit A7, it may be determined that the cycle of the reference clock signal CLK is shorter than the cycle of the second count signal Sk2. Further, the pulse width of the H-level first FF signal Sf1 indicates the difference between the cycle lengths of the reference clock signal CLK and the second count signal Sk2.

When the reference clock signal CLK and the second count signal Sk2 rise to the H level concurrently, the seventh and eighth D-FF circuits A7 and A8 output the first and second FF signals Sf1 and Sf2 and cause the FF signals Sf1 and Sf2 to fall to the L level upon detecting that the reference clock signal CLK and the second count signal Sk2 rise to the H level, respectively. Accordingly, it may be determined that the cycles lengths of the reference clock signal CLK and the second count signal Sk2 are substantially the same. For convenience in explanation, it is considered herein that when the cycle lengths of the reference clock signal CLK and the second count signal Sk2 are substantially the same, the seventh and eighth D-FF circuits A7 and A8 do not output the corresponding H-level first and second FF signals Sf1 and Sf2.

The XOR circuit 21 receives the first and second FF signals Sf1 and Sf2 that are output from the seventh and eighth D-FF circuits A7 and A8, respectively. When the input first and second FF signals Sf1 and Sf2 are at the H level, the XOR circuit 21 outputs an H-level switching signal Ssw to the ON-time setting circuit 11.

Thus, the XOR circuit 21 detects a time difference between the timings at which the first and second FF signals Sf1 and Sf2 rise to the H level. That is, the XOR circuit 21 detects the time difference between the timings at which the reference clock signal CLK and the second count signal Sk2 rise to the H level. When the time difference is present, the XOR circuit 21 outputs the H-level switching signal Ssw.

In other words, the XOR circuit 21 outputs the H-level switching signal Ssw when the cycle lengths of the reference clock signal CLK and the second count signal Sk2 are different. Since the seventh and eighth D-FF circuits A7 and A8 do not operate during the soft start operation of the DC-DC converter 1, both the first FF signal Sf1 and the second FF signal Sf2 reach the L level, and the XOR circuit 21 outputs the L-level switching signal Ssw.

As further illustrated in FIG. 3, the integrator circuit 22 includes a first amplifier circuit 26, first and second resistors R1 and R2, and a second capacitor C2.

The second FF signal Sf2 is input to an inverting input terminal of the first amplifier circuit 26 through the first resistor R1. The first amplifier circuit 26 is coupled to an output terminal of the integrator circuit 22 through a parallel circuit including the second resistor R2 and the second capacitor C2. A second reference voltage Vr2 having a substantially half value of the value of the input voltage VIN (VIN/2) in the embodiment is input to a non-inverting input terminal of the first amplifier circuit 26.

Thus, the integrator circuit 22 outputs the integral of the second FF signal Sf2 to the ON-time setting circuit 11 as an integrated voltage Vd. In other words, the integrator circuit 22 increases the value of the integrated voltage Vd with respect to the second reference voltage Vr2 as the L-level second FF signal Sf2 is input for a longer time. The integrator circuit 22 decreases the value of the integrated voltage Vd with respect to the second reference voltage Vr2 as the H-level second FF signal Sf2 is input for a longer time.

For example, the integrator circuit 22 outputs the integrated voltage Vd to the ON-time setting circuit 11 based on the time difference between the timings at which the reference clock signal CLK and the second count signal Sk2 rise to the H level. That is, the integrator circuit 22 lowers the value of the integrated voltage Vd with respect to the second reference voltage Vr2 as it takes a longer time for the reference clock signal CLK to reach the H level than the second count signal Sk2. The integrator circuit 22 raises the value of the integrated voltage Vd with respect to the second reference voltage Vr2 as it takes a shorter time for the reference clock signal CLK to reach the H level than the second count signal Sk2.

In other words, the integrator circuit 22 outputs the integrated voltage Vd to the ON-time setting circuit 11 based on the difference between the cycle lengths of the reference clock signal CLK and the second count signal Sk2. That is, the integrator circuit 22 raises the value of the integrated voltage Vd with respect to the second reference voltage Vr2 as the cycle of the reference clock signal CLK is shorter than the cycle of the second count signal Sk2. The integrator circuit 22 lowers the value of the integrated voltage Vd with respect to the second reference voltage Vr2 as the cycle of the reference clock signal CLK is longer than the cycle of the second count signal Sk2.

Figure 4:
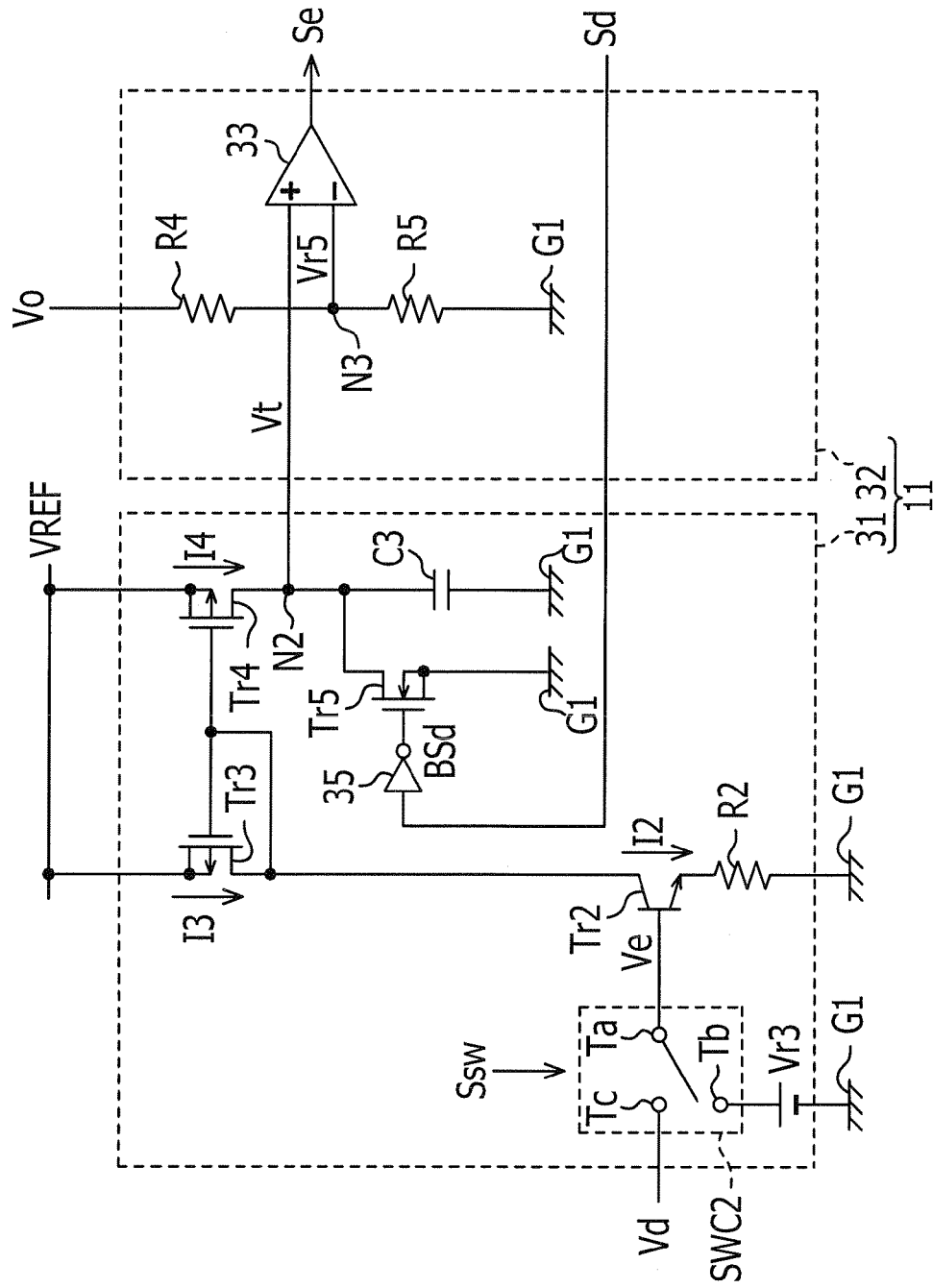
FIG. 4 illustrates an ON-time setting circuit according to the embodiment in FIG. 1.

As illustrated in FIG. 4, the ON-time setting circuit 11 includes a set voltage control circuit 31, and a comparison part 32.

The set voltage control circuit 31 includes a second transistor Tr2 that is an NPN bipolar transistor, a second changeover switch SWC2, third and fourth transistors Tr3 and Tr4 that are P-channel metal oxide semiconductor transistors, a fifth transistor Tr5 that is an NMOS transistor, the second resistor R2, a third capacitor C3, and an inverter circuit 35.

The emitter of the second transistor Tr2 is coupled to the ground line G1 through the second resistor R2. The collector of the second transistor Tr2 is coupled to the gate and drain of the third transistor Tr3, and the gate of the fourth transistor Tr4. The integrated voltage Vd from the phase comparator 10, or the third reference voltage Vr3 (VIN/2 in the embodiment) is input to the base of the second transistor Tr2 through the second changeover switch SWC2 as a current control voltage Ve.

The second changeover switch SWC2 operates based on the switching signal Ssw from the phase comparator 10 so that a first terminal Ta may be coupled to a second terminal Tb or a third terminal Tc. That is, when the L-level switching signal Ssw is input, the second changeover switch SWC2 allows the first terminal Ta to be coupled to the second terminal Tb and outputs the third reference voltage Vr3 as the current control voltage Ve. When the H-level switching signal Ssw is input, the second changeover switch SWC2 allows the first terminal Ta to be coupled to the third terminal Tc and outputs the integrated voltage Vd as the current control voltage Ve.

For example, the second changeover switch SWC2 outputs the third reference voltage Vr3 as the current control voltage Ve in the soft start operation of the DC-DC converter 1. When the cycle lengths of the reference clock signal CLK and the second count signal Sk2 are substantially the same, the second changeover switch SWC2 outputs the current control voltage Ve based on the third reference voltage Vr3 in the normal operation of the DC-DC converter 1.

When the cycle of the reference clock signal CLK is shorter than the cycle of the second count signal Sk2 in the normal operation of the DC-DC converter 1, the second changeover switch SWC2 outputs the current control voltage Ve based on the integrated voltage Vd having a value higher than the value of the third reference voltage Vr3. When the cycle of the reference clock signal CLK is longer than the cycle of the second count signal Sk2 in the normal operation of the DC-DC converter 1, the second changeover switch SWC2 outputs the current control voltage Ve based on the integrated voltage Vd having a value lower than the value of the third reference voltage Vr3.

Thus, the value of a collector current I2 depends on the value of the current control voltage Ve. That is, the value of the collector current I2 of the second transistor Tr2 increases as the value of the current control voltage Ve becomes higher, or decreases as the value of the current control voltage Ve becomes lower.

A reference voltage VREF is supplied to the source of the third transistor Tr3 and the source of the fourth transistor Tr4. The reference voltage VREF is obtained by stepping down the input voltage VIN and is independent of a change in, for example, the value of the input voltage VIN or a temperature. The drain of the fourth transistor Tr4 is coupled to the ground line G1 through the third capacitor C3 and is coupled also to the drain of the fifth transistor Tr5.

The third and fourth transistors Tr3 and Tr4 operate as a current mirror circuit. A drain current I3 of the third transistor Tr3 has substantially the same value as the value of the collector current I2. The ratio between the drain current I3 of the third transistor T3 and a drain current I4 of the fourth transistor Tr4 depends on the sizes of the transistors T3 and T4.

Accordingly, the value of the drain current I4 of the fourth transistor Tr4 depends on the value of the current control voltage Ve. That is, the value of the drain current I4 of the fourth transistor Tr4 increases as the value of the current control voltage Ve becomes higher, or decreases as the value of the current control voltage Ve becomes lower.

The third capacitor C3 is charged with the drain current I4 of the fourth transistor Tr4, and the value of the ON time setting voltage Vt obtained at an end of the third capacitor C3 (e.g., on the side of the fourth transistor Tr4) increases. The value of the ON time setting voltage Vt depends on the value of the current control voltage Ve. It takes a shorter time to charge the third capacitor C3 and increase the value of the ON time setting voltage Vt as the value of the current control voltage Ve becomes higher. That is, it takes a longer time to charge the third capacitor C3 and increase the value of the ON time setting voltage Vt as the value of the current control voltage Ve becomes lower.

The inverter circuit 35 generates an inverted driving signal BSd by inverting the driving signal Sd from the pulse generator 9. The inverted driving signal BSd is input to the gate of the fifth transistor Tr5. The source of the fifth transistor Tr5 is coupled to the ground line G1. The fifth transistor Tr5 is turned on and/or off based on the input inverted driving signal BSd. The fifth transistor Tr5 is turned off when the L-level inverted driving signal BSd is input. When the H-level inverted driving signal BSd is input, the fifth transistor Tr5 is turned on, releasing electric charges accumulated in the third capacitor C3, and causing the ON time setting voltage Vt to reach a ground level.

Thus, the fifth transistor Tr5 causes the ON time setting voltage Vt to reach the ground level when the output transistor Tr1 of the converter part 2 in FIG. 1 is turned off. The ON time setting voltage Vt is output from a coupling point of the fourth and fifth transistors Tr4 and Tr5, and the third capacitor C3, that is, a node N2, to the comparison part 32.

As further illustrated in FIG. 4, the comparison part 32 includes a second comparator circuit 33, a fourth resistor R4, and a fifth resistor R5.

The ON time setting voltage Vt is input from the set voltage control circuit 31 to a non-inverting input terminal of the second comparator circuit 33. An inverting input terminal of the second comparator circuit 33 is coupled to a coupling point of the fourth and fifth resistors R4 and R5 that form a series circuit, e.g., a node N3. The output voltage Vo is supplied to an end of a series circuit including the fourth and fifth resistors R4 and R5, which is located on the side of the fourth resistor R4, to the other end of the series circuit, which is located on the side of the fifth resistor R5, and is coupled to the ground line G1. The voltage of the node N3 is output to the inverting input terminal of the second comparator circuit 33 as a fifth reference voltage Vr5.

When the value of the ON time setting voltage Vt is lower than the value of the fifth reference voltage Vr5, the second comparator circuit 33 outputs an ON-time setting signal Se at the L level to the reset input terminal R of the pulse generator 9 in FIG. 1. When the value of the ON time setting voltage Vt is higher than or substantially equal to the value of the fifth reference voltage Vr5, the second comparator circuit 33 outputs the ON-time setting signal Se at the H level to the reset input terminal R of the pulse generator 9 in FIG. 1.

When the H-level driving signal Sd is input from the pulse generator 9 and the output transistor Tr1 of the converter part 2 is turned on, the ON-time setting circuit 11 outputs the L-level ON-time setting signal Se and maintains the output transistor Tr1 in the ON state. The ON-time setting circuit 11 causes the ON-time setting signal Se to rise from the L level to the H level based on the current control voltage Ve, and outputs the H-level ON-time setting signal Se so that the output transistor Tr1 of the converter part 2 is turned off. That is, the ON-time setting circuit 11 shortens the ON time of the output transistor Tr1 as the value of the current control voltage Ve increases, or lengthens the ON time of the output transistor Tr1 as the value of the current control voltage Ve decreases. Since the current control voltage Ve remains constant during the soft start operation of the DC-DC converter 1, the ON-time setting circuit 11 maintains the length of the ON time of the output transistor Tr1 constant.

That is, in the normal operation of the DC-DC converter 1, the phase comparator 10 detects the time difference between the cycle of the reference clock signal CLK and the cycle of the second count signal Sk2. The ON-time setting circuit 11 controls the ON time of the output transistor Tr1 of the converter part 2 so that the time difference detected by the phase comparator 10 may be reduced if not prevented.

Since the frequency of the switching voltage Vsw is divided by four to generate the second count signal Sk2, the DC-DC converter 1 may correct the switching frequency once in a period where the output transistor Tr1 is switched four times.

According to the embodiment, the counter circuit 5 counts the reference clock signal CLK using the first to fourth D-FF circuits A1 to A4 in the soft start operation, and divides the frequency of the switching voltage Vsw using the first and second D-FF circuits A1 and A2 in the normal operation.

That is, the first and second D-FF circuits A1 and A2 are used for counting the reference clock signal CLK in the soft start operation and also for dividing the frequency of the switching voltage Vsw in the normal operation. Accordingly, circuit enlargement may be reduced if not prevented.

The embodiment may be modified as described below. The embodiment employs D-FF circuits as the first to fourth D-FF circuits A1 to A4 of the counter circuit 5, however, other circuits may be used instead as long as the circuits function as counters.

In the embodiment, the first and second D-FF circuits A1 and A2 are used as the counter circuits for dividing the frequency of the switching voltage Vsw in the normal operation and also as the counter circuits for counting the reference clock signal CLK in the soft start operation. However, the counter circuits used for counting the reference clock signal CLK in the soft start operation in addition to dividing the frequency of the switching voltage Vsw in the normal operation are not limited as long as the counter circuits are not used in the normal operation.

In the embodiment, the second count signal Sk is generated by dividing the frequency of the switching voltage Vsw by four, and the reference clock signal CLK is counted to the count value "16." However, the frequency of the switching voltage Vsw may be divided by another number and the count value is not limited. Accordingly, the number of D-FF circuits, such as the D-FF circuits A1 to A4, may be changed depending on the dividing number and the count value.

In the embodiment, the value of the ON time setting voltage Vt is changed by controlling the drain current I4 of the fourth transistor Tr4, which is used for charging the third capacitor C3. The value of the ON time setting voltage Vt may be changed by controlling the capacitance value of the third capacitor C3.

The embodiment discusses the step-down DC-DC converter that generates the output voltage Vo by stepping down the input voltage VIN. However, the DC-DC converter may be a step-up DC-DC converter that generates the output voltage Vo by stepping up the input voltage VIN.

The embodiment employs an asynchronous rectification DC-DC converter. However, a synchronous rectification DC-DC converter may be used instead of the asynchronous rectification DC-DC converter.

The embodiment employs a voltage control mode DC-DC converter. However, a current control mode DC-DC converter may be used instead of the voltage control mode DC-DC converter.

In the embodiment, the counter circuit used in the soft start operation is the same as the counter circuit used for dividing the switching frequency in the normal operation. As described above, using the same counter circuit may reduce, if not prevent, circuit enlargement.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention. Although the embodiment in accordance with aspects of the present invention has been described in detail, it should be understood that various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A power control circuit comprising:
   a control circuit configured to perform a soft start operation before a normal operation and to correct a switching frequency, the control circuit comprising:
   a counter circuit configured to measure a period of the soft start operation and to generate count data;
   a digital-to-analog (D/A) conversion circuit configured to convert the count data to a soft start voltage;
   a first comparator circuit configured to compare the soft start voltage, a first reference voltage, and an output voltage and to output a determination signal to a pulse generator based on the comparison;
   a pulse generator configured to generate a driving signal based on a duty ratio;
   a phase generator configured to detect a time difference between a cycle of a reference clock signal and a cycle of a count signal; and
   an ON-time setting circuit configured to reduce the time difference detected by the phase comparator; and
   a converter circuit configured to step down an input voltage by controlling a transistor based on the driving signal from the control circuit.

2. The power control circuit according to claim 1, wherein the counter circuit is configured for a digital soft start operation while measuring the period.

3. The power control circuit according to claim 1, wherein the D/A conversion circuit is further configured to increase a level of the soft start voltage when the counter circuit increases a counter clock signal and to maintain an initial level of the soft start voltage upon receipt of a high-level soft-start completion signal.

4. The power control circuit according to claim 1, wherein the first comparator circuit is configured to compare a lower one of the soft start voltage and the first reference voltage with a value of the output voltage, wherein:
   when a value of the lower one of the soft start voltage and the first reference voltage is lower than the value of the output voltage, the first comparator circuit outputs a low-level determination signal; and
   when the value of the lower one of the soft start voltage and the first reference voltage is higher than the value of the output voltage, the first comparator circuit outputs a high-level determination signal.

5. The power control circuit according to claim 1, wherein the phase comparator and the ON-time setting circuit are configured to control a length of time for which the pulse generator outputs a high-level driving signal, wherein a transistor of the output circuit is turned on while the pulse generator outputs the high-level driving signal.

6. A power supply device comprising:
   a converter circuit comprising:
   an inductor;
   a switch coupled between the inductor and an input voltage terminal;
   a diode coupled between the inductor and a reference voltage terminal; and
   a control circuit configured to control a switching frequency of the switch, wherein the control circuit comprises:
   a counter circuit configured to measure a period of the soft start operation and to generate count data;
   a digital-to-analog (D/A) conversion circuit configured to convert the count data to a soft start voltage;
   a first comparator circuit configured to compare the soft start voltage, a first reference voltage, and an output voltage of the converter circuit and to output a determination signal to a pulse generator based on the comparison;
   a pulse generator configured to generate a driving signal based on a duty ratio;
   a phase comparator is configured to detect a time difference between a cycle of a reference clock signal and a cycle of a count signal; and
   an ON-time setting circuit is configured to reduce the time difference detected by the phase comparator.

7. The power supply device according to claim 6, wherein the counter circuit is configured for a digital soft start operation while measuring the period.

8. The power supply device according to claim 6, wherein the D/A conversion circuit is further configured to increase a level of the soft start voltage when the counter circuit increases a counter clock signal and to maintain an initial level of the soft start voltage upon receipt of a high-level soft-start completion signal.

9. The power supply device according to claim 6, wherein the first comparator circuit is configured to compare a lower one of the soft start voltage and the first reference voltage with the value of the output voltage, wherein:
   when a value of the lower one of the soft start voltage and the first reference voltage is lower than the value of the output voltage, the first comparator circuit outputs a low-level determination signal; and
   when the value of the lower one of the soft start voltage and the first reference voltage is higher than the value of the output voltage, the first comparator circuit outputs a high-level determination signal.

10. The power supply device of according to claim 6, wherein the phase comparator and the ON-time setting circuit are configured to control a length of time for which the pulse generator outputs a high-level driving signal, wherein the switch of the converter circuit is turned on while the pulse generator outputs the high-level driving signal.

11. An electronic device comprising:
   a converter circuit comprising:
      an inductor;
      a switch coupled between the inductor and an input voltage terminal;
      a diode coupled between the inductor and a reference voltage terminal; and
      a load supplied with an output voltage of the switch; and
   a control circuit configured to control a switching frequency of the switch based on the output voltage of the switch,
   wherein the control circuit comprises:
      a counter circuit configured to measure a period of the soft start operation and to generate count data;
      a digital-to-analog (D/A) conversion circuit configured to convert the count data to a soft start voltage;
      a first comparator circuit configured to compare the soft start voltage, a first reference voltage, and an output voltage and to output a determination signal to a pulse generator based on the comparison;
      a pulse generator configured to generate a driving signal based on a duty ratio; and
      a phase comparator is configured to detect a time difference between a cycle of a reference clock signal and a cycle of a count signal.

12. The electronic device according to claim 11, wherein the counter circuit is configured for a digital soft start operation while measuring the period.

13. The electronic device according to claim 11, wherein the D/A conversion circuit is further configured to increase a level of the soft start voltage when the counter circuit increases a counter clock signal and to maintain an initial level of the soft start voltage upon receipt of a high-level soft-start completion signal.

14. The electronic device according to claim 11, wherein the first comparator circuit is configured to compare a lower one of the soft start voltage and the first reference voltage with the value of the output voltage, wherein:
   when a value of the lower one of the soft start voltage and the first reference voltage is lower than the value of the output voltage, the first comparator circuit outputs a low-level determination signal; and
   when the value of the lower one of the soft start voltage and the first reference voltage is higher than the value of the output voltage, the first comparator circuit outputs a high-level determination signal.

15. The electronic device according to claim 11, further comprising an ON-time setting circuit configured to reduce the time difference detected by the phase comparator, wherein the phase comparator and the ON-time setting circuit are configured to control a length of time for which the pulse generator outputs a high-level driving signal, wherein the switch of the converter circuit is turned on while the pulse generator outputs the high-level driving signal.

* * * * *